W. WERTH.
ATTACHMENT FOR WEIGHING AND SLICING MACHINES.
APPLICATION FILED JUNE 16, 1909.
1,062,065.
Patented May 20, 1913.
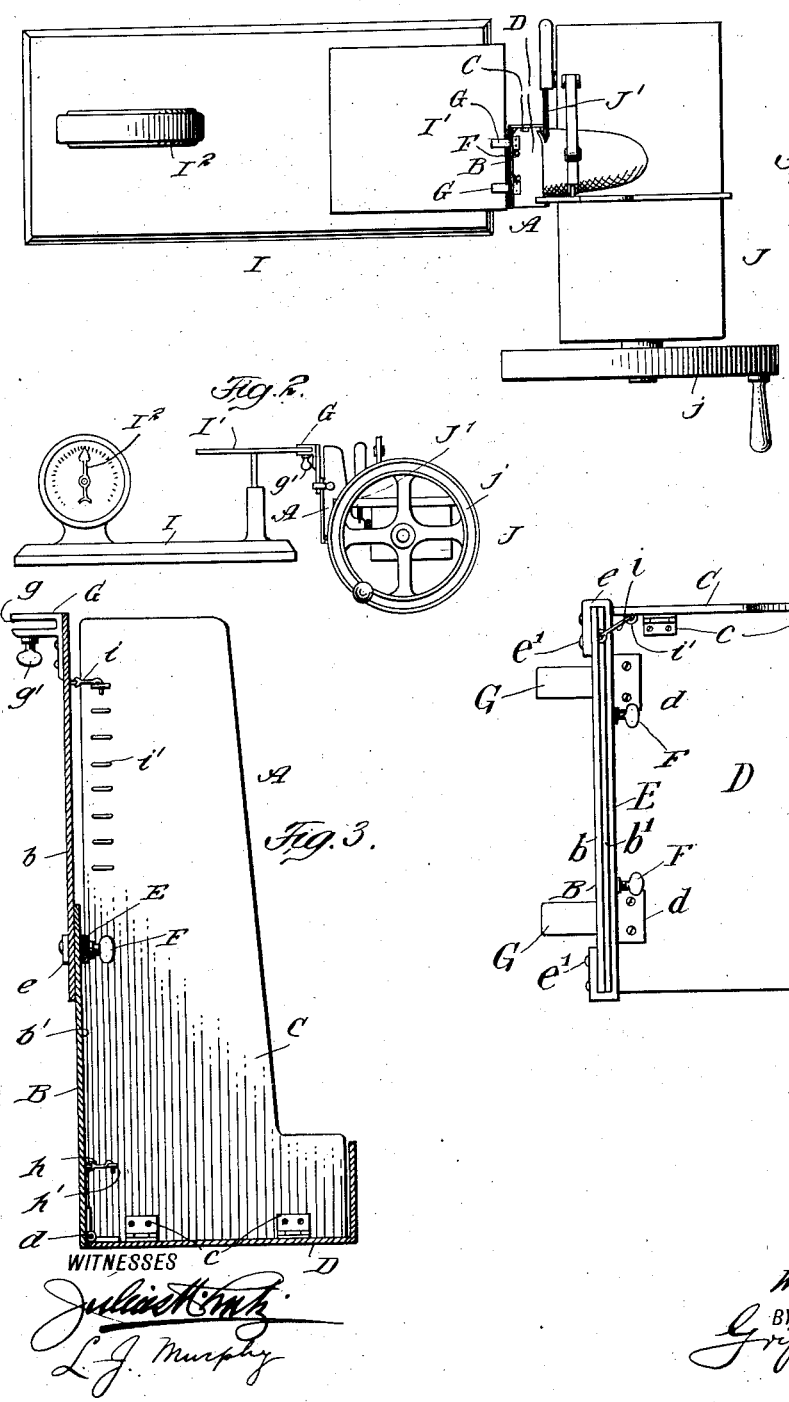
INVENTOR
Walter Werth
BY
Griffith Burkard
ATTORNEYS.
WITNESSES

UNITED STATES PATENT OFFICE.

WALTER WERTH, OF NEW YORK, N. Y.

ATTACHMENT FOR WEIGHING AND SLICING MACHINES.

1,062,065.  Specification of Letters Patent.  Patented May 20, 1913.

Application filed June 16, 1909. Serial No. 502,500.

*To all whom it may concern:*

Be it known that I, WALTER WERTH, a subject of the German Empire, residing in the city of New York, borough of Manhattan, county and State of New York, have invented a certain new and useful Attachment for Weighing and Slicing Machines, of which the following is a specification.

In stores retailing sliced meats, cheese, and other food products, it is customary for the store keeper or clerk to slice the meat or cheese by hand or by a slicing machine of one form or another, and to thereafter transfer the sliced product to weighing scales. These operations require the sliced food to be handled in order to weigh it, and the operator is required to guess at the quantity of food sliced before its weight is ascertained by the action of the scales, so that the operator not infrequently cuts off more of the meat, etc., than is desired by the customer, with the result that surplus cut material soon becomes too dry owing to the action of the air thereon.

The object of my invention is to overcome the foregoing objections by a simple construction adapted to be applied to a weighing scale in a manner to receive the sliced material directly from a slicing machine, whereby the weight of the sliced material may be ascertained directly after each slice is cut and the necessity for handling said sliced material is avoided.

With these, and other, ends in view, my invention is embodied in a hopper provided with clamps for securing it to a platform of an ordinary weighing scale. Said hopper comprises a back wall, a side wall, and a bottom, the several walls and the clamps being so arranged that the hopper may depend from the scale platform and extend below the delivery end of the slicing machine in a manner for the sliced material to drop by gravity from said slicing material upon the bottom of the hopper.

In a preferred form of the hopper, it is made adjustable in order to adapt it for different styles and sizes of weighing scales and slicing machines; and, furthermore, said hopper is constructed to enable its several parts to be folded compactly for storage and transportation.

In the accompanying drawings I have illustrated one practical embodiment of the invention, but the construction shown therein is to be understood as illustrative only, and not as defining the limits of the invention.

Figure 1 is a plan view illustrating my attachment in coöperative relation to a weighing scale and a slicing machine. Fig. 2 is a view in front elevation of the parts shown in Fig. 1. Fig. 3 is a vertical cross section taken centrally through the attachment, the same being shown on an enlarged scale as compared with Figs. 1 and 2. Fig. 4 is a plan view of the attachment shown in Fig. 3.

My invention is shown more particularly in Figs. 3 and 4 of the drawings, and as hereinbefore stated, said invention is embodied in a hopper, the parts of which are preferably foldable into compact relationship for the purpose of facilitating the storage or transportation thereof. Said hopper is indicated in its entirety by the reference character, A, and it comprises a back wall, B, a side wall, C, and a bottom, D.

Back wall, B, is preferably composed of sections, $b$, $b'$, which are fitted into lapping engagement at their meeting portions, as shown in Figs. 3 and 4, whereby the back wall may be extended or shortened according to the varying positions of different scale pans with relation to the delivery ends of slicing machines, as will more fully hereinafter appear. The sections composing the back wall are held adjustably together by any suitable form of clamping and adjusting means, but as shown, a clamping member, E, is bent at its ends, $e$, to embrace the sections, $b$, $b'$. The bent ends of clamping member, E, are adapted to be fastened rigidly by rivets, $e'$, or their equivalents, to section, $b$, see Fig. 4, and in the clamping member are mounted the binding screws, F, the latter being adapted for engagement with section, $b'$, of the back wall. It is evident that screws, F, may be released and the section, $b$, may be raised or lowered with respect to the clamping device and the section, $b'$, after which the screws are tightened in the clamping rail for the purpose of holding sections, $b$, $b'$, firmly in their adjusted positions.

The hopper is adapted to be suspended from a part of the scale, such as the platform thereof, and for the purpose of attaching said hopper rigidly to said scale, I employ suitable clamping devices, one of which is shown at G in Fig. 3. The clamping device consists of a bracket having a slot, g, said bracket being fastened rigidly to the section, b, of the extensible back wall, substantially at the upper edge thereof. Two or more brackets, G, are employed, as shown in Figs. 1 and 4, and they extend outwardly from the back wall, B, so that the slots, g, of said brackets may receive an edge portion of the platform, or any other suitable part, of a scale. Each bracket is provided with a set screw, g', preferably positioned below the slotted part of the bracket and adapted to be tightened against the scale for the purpose of securing hopper, A, firmly on said scale.

It is preferred in one form of the invention to employ a foldable construction of the hopper, and to accomplish this, bottom member, D, is hinged at d to the lower section, b', of the back wall, whereas the side wall, C, is united by hinges, c, to an edge portion of the bottom, D. The side wall may be folded inwardly upon the bottom, and said bottom and side wall may then be folded upwardly against the back wall, thereby disposing the several parts in compact relation. For the purpose of holding the side wall and the bottom in their opened operative positions, as shown in Figs. 3 and 4, I employ suitable locking devices which coöperate with the back and side walls. As shown, a hook, h, is attached to section, b', of the back wall and is adapted for engagement with an eye, h', of side wall, C. Another hook, i, is connected to the upper sliding section, b, of the back wall, and said hook, i, is adapted for engagement with any one of a plurality of eyes, i', provided on side wall, C, at a point above clamping devices, E, F. The employment of a plurality of eyes, i', on the side wall enables the hook, i, to be engaged therewith at any point in the vertical adjustment of slidable member, b, of the back wall.

My attachment is adapted for use in connection with various forms of weighing scales and different kinds of slicing machines, and in Figs. 1 and 2 I have shown said attachment in coöperative relation to said old forms of machines. In the embodiment shown, weighing scale, I, is provided with a platform, I', the movement of which is communicated by the scale mechanism to an index or pointer, I². Slicing machine, J, is provided with a cutter, J', such as a swing cutter, adapted to be operated by the rotation of crank wheel, j, in any usual manner well understood by those skilled in the art.

The attachment is applied easily and quickly to the weighing scale. This is performed by placing the attachment in position by adjusting it for an edge portion of the platform, I', to enter slots, g, of brackets, G, after which set screws, g', are tightened so that the hopper is fastened rigidly to the scale. Said hopper depends from the scale, at one end of said scale, and the bottom portion of said attachment is adapted to extend below the delivery end of the slicing machine, J.

It will be observed that the pendent hopper is rigidly attached to the scale for movement therewith, and said hopper is so related to the delivery end of slicing machine, J, that the hopper will be free to move up and down with the scale, whereby the hopper is brought into coöperative relation to the slicing machine in a manner for the sliced material to drop directly upon the bottom of said hopper.

The operation of the attachment when applied to a scale and adjusted to receive the sliced material from the machine, J, will be understood from the foregoing description taken in connection with Figs. 1 and 2 of the drawings. It is desired to remark, however, that the attachment may be easily applied to different forms of scales, and by making the back wall of said hopper adjustable in the manner described, the attachment may be adjusted to suit the height of the scale platform from the delivery end of a slicing machine. It is evident that the back wall of the hopper may be lengthened or shortened easily and quickly and without interfering with the means for clamping the attachment upon the scale.

As heretofore stated, my attachment enables the sliced material to be weighed as it is delivered from the slicing machine, so that the operator is not required to handle the sliced material, and is in a position to ascertain when sufficient material has been sliced to secure the desired weight. Of course, the scale must be adjusted to compensate for the weight of the attachment and to accurately indicate the weight of the material deposited thereon.

It is evident that changes in the form, size and proportion of parts whereby the attachment may be adapted to scales of a particular type, or in fact to any or all counter or hanging scales, may be made without departing from the spirit of the invention.

Having thus fully described the invention, what I claim as new, and desire to secure by Letters Patent is:

1. In a device of the class described, the combination of a slicing machine, a weighing scales, a receiving hopper having members connected adjustably together whereby the operative length of said hopper may be varied in order to position said hopper in coöperative relation to the slicing machine, and means for connecting said hopper to a movable part of said weighing scales.

2. In a device of the class described, the combination of a slicing machine, a weighing scales, a receiving hopper having members fitted together for adjustment relative to each other, clamping means for retaining the said members in fixed relation to each other at any point of their relative adjustment, whereby the operative length of said hopper may be varied in order to position the hopper in coöperative relation to the slicing machine, and a plurality of attaching devices for fastening said hopper to a movable part of said weighing scales.

3. An attachment for weighing scales and adapted for coöperation with slicing devices, comprising a receiving and retaining hopper composed of a bottom, a side wall, and a back wall, foldably connected to each other, means for retaining said walls in their unfolded operative positions, and means for suspending the hopepr from the scale, whereby the hopper is positioned below the delivery end of the slicing devices for receiving sliced material directly therefrom.

4. An attachment for weighing scales and adapted for coöperation with slicing devices, comprising a hopper having a bottom, a side wall, and a back wall, one of said walls consisting of sections adjustable relative to each other, means for holding said sections of the wall in rigid relation to each other, and means for suspending said hopper from the scales.

5. An attachment for weighing scales and adapted for coöperation with slicing devices, comprising a hopper composed of an extensible back wall having means for rigidly holding its parts in fixed relation, a side wall foldable relatively to the back wall, a foldable bottom, means for retaining said walls in their operative positions, and means for attaching the hopper to a scale.

In testimony whereof I have signed my name to this specification in the presence of two subscribing witnesses.

WALTER WERTH.

Witnesses:
  Jas. H. Griffin,
  H. I. Bernhard.